US008875133B2

(12) United States Patent
Hayward et al.

(10) Patent No.: US 8,875,133 B2
(45) Date of Patent: Oct. 28, 2014

(54) MIGRATION OF VIRTUAL MACHINES (71) Applicant: International Business Machines Corporation, Armonk, NY (US)

(72) Inventors: Alan Hayward, Manchester (GB); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/780,061

(22) Filed: Feb. 28, 2013

(65) Prior Publication Data
US 2013/0179883 A1 Jul. 11, 2013

Related U.S. Application Data (63) Continuation of application No. 13/356,782, filed on Jan. 24, 2012.

(30) Foreign Application Priority Data

Jan. 25, 2011 (EP) .................................... 11152042

(51) Int. Cl.
G06F 9/455 (2006.01)
(52) U.S. Cl.
CPC ............ G06F 9/45558 (2013.01); G06F 9/455 (2013.01)
USPC ................................ 718/1; 709/223; 709/224
(58) Field of Classification Search
USPC ................. 709/1, 223; 714/4; 718/1
See application file for complete search history.

(56) References Cited

U.S. PATENT DOCUMENTS

| 7,761,573 | B2 | 7/2010 | Travostino et al. | |
|---|---|---|---|---|
| 2003/0074386 | A1* | 4/2003 | Schmidt et al. | 709/1 |
| 2005/0268298 | A1 | 12/2005 | Hunt et al. | |
| 2006/0026195 | A1 | 2/2006 | Gu et al. | |
| 2007/0169121 | A1* | 7/2007 | Hunt et al. | 718/1 |
| 2007/0283348 | A1* | 12/2007 | White | 718/1 |
| 2009/0000710 | A1 | 1/2009 | Ford et al. | |

(Continued)

FOREIGN PATENT DOCUMENTS

EP 2182437 5/2010

OTHER PUBLICATIONS

Apte, Renuka, et al. "Look Who's Talking: Discovering dependencies between virtual machines using CPU utilization." 2010. Proceedings of the 2nd USENIX conference on Hot topics in cloud computing. USENIX Association.*

(Continued)

Primary Examiner — Lewis A Bullock, Jr.
Assistant Examiner — Gilles Kepnang
(74) Attorney, Agent, or Firm — Yudell Isidore Ng Russell PLLC; Matthew Baca (57) ABSTRACT To migrate two or more virtual machines in a source hypervisor to a target hypervisor, a list of active and connected virtual machines in the source hypervisor is acquired. Connections between the source virtual machines are rerouted to a buffer so that data flowing between the source virtual machines is captured. The source virtual machines are migrated to a target hypervisor and are connected in the same manner as in the source hypervisor. The buffered data is migrated to the respective migrated virtual machines, and the target virtual machines are activated. The virtual machines can be migrated in order of data flow dependency such that the least dependent virtual machine is migrated first.

6 Claims, 10 Drawing Sheets

(56) References Cited

U.S. PATENT DOCUMENTS

| | | | |
|---|---|---|---|
| 2009/0027178 A1 | 1/2009 | Rebsch | |
| 2009/0064136 A1* | 3/2009 | Dow et al. | 718/1 |
| 2009/0089781 A1* | 4/2009 | Shingai et al. | 718/1 |
| 2009/0106409 A1* | 4/2009 | Murata | 709/223 |
| 2009/0125904 A1* | 5/2009 | Nelson | 718/1 |
| 2009/0138752 A1* | 5/2009 | Graham et al. | 714/4 |
| 2010/0007102 A1 | 1/2010 | Chen | |
| 2010/0071025 A1* | 3/2010 | Devine et al. | 726/1 |
| 2011/0004876 A1* | 1/2011 | Wu et al. | 718/1 |
| 2011/0209146 A1* | 8/2011 | Box et al. | 718/1 |
| 2011/0307886 A1* | 12/2011 | Thanga et al. | 718/1 |
| 2012/0174112 A1 | 7/2012 | Vaidya et al. | |
| 2012/0254860 A1 | 10/2012 | Bozek et al. | |
| 2012/0254862 A1* | 10/2012 | Dong | 718/1 |
| 2012/0311568 A1* | 12/2012 | Jansen | 718/1 |

OTHER PUBLICATIONS

Shrivastava, Vivek, et al. "Application-aware virtual machine migration in data centers." 2011. INFOCOM, 2011 Proceedings IEEE. IEEE.*

Wang, Jian, Kwame-Lante Wright, and Kartik Gopalan. "XenLoop: a transparent high performance inter-vm network loopback." 2008. Proceedings of the 17th international symposium on High performance distributed computing. ACM.*

U.S. Appl. No. 13/356,782 entitled "Migration of Virtual Machines"; final office action dated Feb. 7, 2014.

U.S. Appl. No. 13/356,782 entitled "Migration of Virtual Machines"; Non-final office action dated Aug. 30, 2013.

Webster definition for "between", As visited on Apr. 23, 2009, Wayback Machine, "https://web.archive.org/web/20090423165612/http://www.merriam.webster.com/dictionary/between".

Bradford, Robert et al.; "LiveWide-Area Migration of Virtual Machines Including Local Persistent State", Jun. 2007, ACM.

Clark, Christopher et al.; "Live Migration of Virtual Machines"; 2005, USENIX.

Das, Tathagata et al.; "LiteGreen: Saving Energy in Networked Desktops Using Virtualization"; 2010, USENIX-ATC.

U.S. Appl. No. 13/356,782 entitled "Migration of Virtual Machines"; Notice of Allowance dated May 23, 2014 (18 pg).

Apte, Renuka, et al.; "Look Who's Talking: Discovering dependencies between Virtual Machines Using CPU Utilization." 2010, Proceedings of the 2nd USENIX conference on Hot Topics in Cloud Computing. USENIX Association.

Shrinavastava, Vivek et al., "Application-Aware Virtual Machine Migration in Data Centers." 2011 INFOCOM, 2011 Proceedings IEEE. IEEE.

Wang, Jian, et al., "XenLoop: A Transparent High Performance Inter-VM Network Loopback." 2008. Proceedings of the 17th Int'l Symposium on High Performance Distributed Computing. ACM.

* cited by examiner

MIGRATION OF VIRTUAL MACHINES

This application is a continuation of U.S. patent application Ser. No. 13/356,782 entitled "MIGRATION OF VIRTUAL MACHINES", filed on Jan. 24, 2012, the disclosure of which is incorporated herein by reference in its entirety for all purposes.

FIELD OF THE INVENTION

The present invention relates in general to a method, apparatus, and computer program product for managing migration of virtual machines. In particular, this invention relates to a method, apparatus, and computer program product for managing the synchronization of the migration of dependent virtual machines.

BACKGROUND OF THE INVENTION

Computing is typically thought of in terms of applications and supporting platforms. Supporting platforms typically include a hardware infrastructure of processor core, input/output, memory and fixed storage. The combination of these devices is what supports an operating system, which in turn supports applications.

Applications are typically self contained bundles of logic relying on little other than core object files and related resource files. As computing became integral to modern industry, applications became co-dependent on the presence of other applications such that the requisite environment for an application included not only the underlying operating system and supporting hardware platform, but also other key applications. Such key applications included application servers, database management servers, collaboration servers and communicative logic commonly referred to as middleware. Given the complexity of application and platform interoperability, different combinations of applications executing in a single hardware platform can demonstrate differing degrees of performance and stability.

Virtualization as a technology aims to interject a layer between a supporting platform and executing applications. From the perspective of business continuity and disaster recovery, virtualization provides the inherent advantage of environment portability. Specifically, to move an entire environment configured with multiple different applications is a matter of moving a virtual image from one supporting hardware platform to another. Further, more powerful computing environments can support the coexistence of multiple different virtual images, all the while maintaining a virtual separation between the images. Consequently, a failure condition in one virtual image cannot jeopardize the integrity of other co-executing virtual images in the same hardware platform.

A virtual machine monitor, known in the art as a "hypervisor," manages the interaction between each virtual image and the underlying resources provided by the hardware platform. In this regard, a hypervisor runs directly on the hardware platform much as an operating system runs directly on hardware. By comparison, a hosted hypervisor runs within a host operating system. In either case, the hypervisor can support the operation of different "guest operating system images"—known as virtual machine (VM) images—the number of VM images being limited only by the processing resources of a VM container holding the VM images or the hardware platform itself.

Virtualization has proven especially useful for those end users requiring separate computing environments for different types of applications while being limited to a single hardware platform. For instance, it is well known for a primary operating system native to one type of hardware platform to provide a virtualized guest operating system native to a different hardware platform so that applications requiring the presence of the guest operating system can co-exist with other applications requiring the presence of the primary operating system. In this way, the end user need not provide separate computing environments each to support a different type of application. Yet, no matter the guest operating system, access to underlying resources of the single hardware platform remains static.

Virtualized environments have been deployed to aggregate different interdependent applications in different VMs in composing an applications solution. For instance, an application server can execute within one VM while a database management system can execute in a different VM and further while a Web server can execute in yet another VM. Each VM can be communicatively coupled to one another in a secure network; however, any given one deployment of the applications can be live migrated to a different deployment without interfering with the execution of the other applications in the other VMs. In a typical live migration, a VM can be moved from one host server to another in order to permit server maintenance or to permit an improvement in hardware support for the VM.

Live migration occurs frequently within the secure computing environment for the VMs managing the execution of the different applications for the applications solution. Yet, live migration also occurs outside of the secure environment. Specifically, on occasion, a VM is moved to a network environment external to the secure computing environment for the remaining VMs managing the remaining applications of the application solution. As a result, communications between the application managed by the VM in the external network and the applications managed by the VMs in the secure computing environment can be compromised through the exchange of data from outside the secure computing environment. Accordingly, live migration to a host server outside of the secure computing environment can introduce a security vulnerability to the applications solution.

In live migration, the stable memory pages of the source VM are moved to the target system. At a critical point the remaining highly active memory pages are moved, but this requires that the source VM be stopped and the final remaining pages are moved to the target VM. The target VM is then started to complete the migration.

When migrating two or more dependent VMs requiring co-location within the same physical system, data transferring between two VMs also needs to be migrated.

SUMMARY OF INVENTION

A method, system, and computer program product for migrating two or more virtual machines in a source hypervisor to a target hypervisor are disclosed. The method includes acquiring a list of active and connected virtual machines in the source hypervisor, rerouting connections between the source virtual machines to a buffer so that data flowing between the source virtual machines is captured, migrating the source virtual machines to a target hypervisor, connecting the migrated virtual machines in the target hypervisor in same way as they were in the source hypervisor, migrating the buffered data to the respective migrated virtual machines, and activating the target virtual machines.

The above as well as additional objectives, features, and advantages of the present invention will become apparent in the following detailed written description.

BRIEF DESCRIPTION OF THE DRAWINGS

Aspects of the invention itself will best be understood by reference to the following detailed description of an illustrative embodiment when read in conjunction with the accompanying drawings, where.

DETAILED DESCRIPTION OF THE EMBODIMENTS

Figure 1:
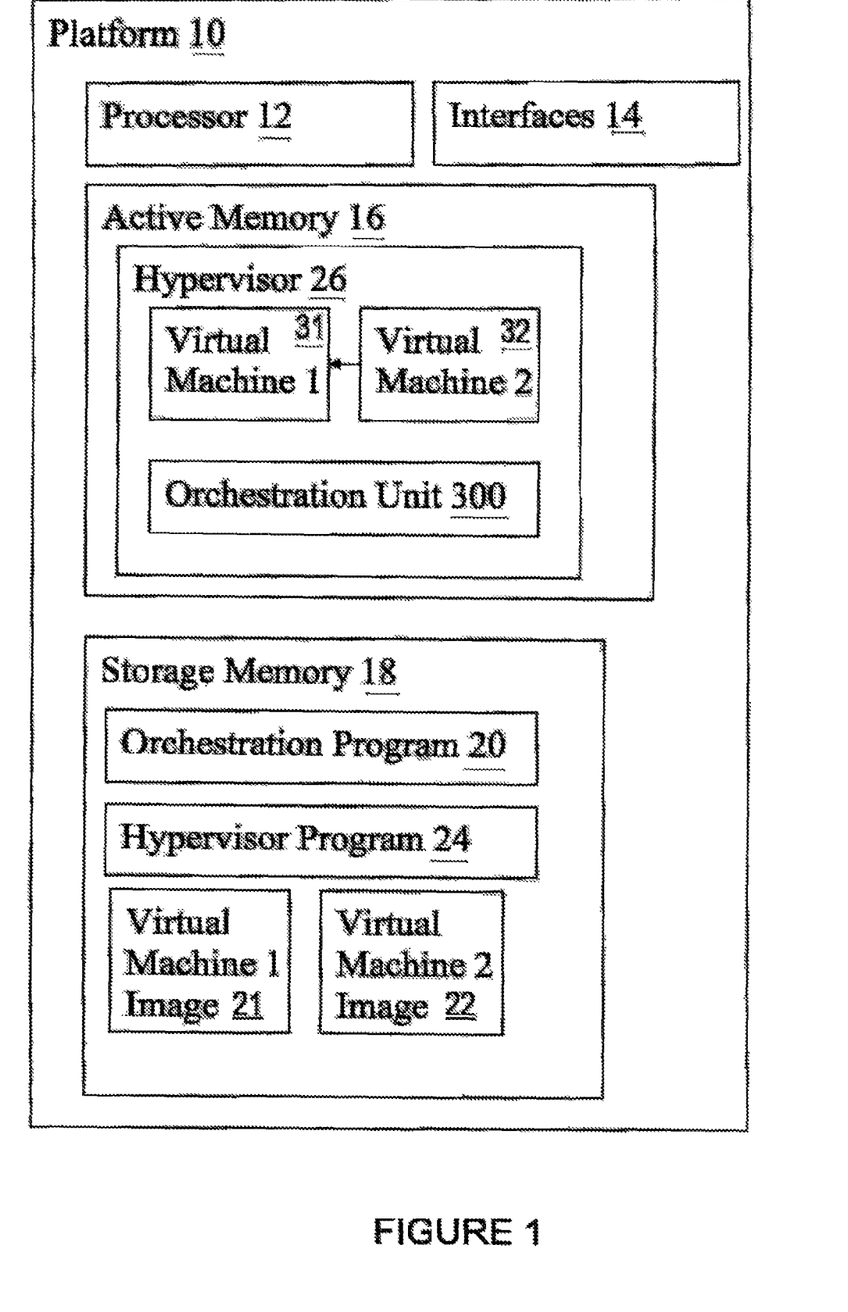
FIG. 1 illustrates a high-level deployment diagram of a platform in accordance with an embodiment of the present invention.

Referring to FIG. 1, there is shown a high-level deployment block diagram of a platform 10 of the present embodiment. Platform 10 comprises: processor 12; interfaces 14; active memory 16; and storage memory 18. An example of platform 10 is an IBM® Power® 750 Express® server.

Processor 12 takes instructions and data from memory and performs logical operations on data according to the instructions. Examples of instructions include add data, subtract data, read data and write data. An example of a processor 12 is an IBM Power7® processor.

Interfaces 14 provide the gateway between the platform 10 and a user. A keyboard input device sends information through an interface 14 to active memory 16. Information is sent from active memory 16 to an output device such as a video monitor.

Active memory 16, which is faster than storage memory 18, is designed for fast access to avoid limiting communication speed with the operating processor 12. Processor 12 has even faster cache memory for small parts of an application, but storage of a whole executing application is in active (execution) memory 16. An example of active memory 16 is 8 GB to 512 GB registered dual in-line memory modules (RDIMM) comprising a series of dynamic random access memory (DRAM) integrated circuits.

Storage memory 18 is slower than active memory 18, but is designed to hold much more data than active memory 16. An example of storage memory is 8 TB SSF (Small Form Factor) SAS (Serial Attached SCSI) disk drive. SCSI (Small Computer System Interface) is a computer bus used to move data to and from computer storage devices such as hard drives.

When platform 10 is not operating, active memory 16 is empty and storage memory 18 persistently stores images of the applications required to execute on platform 10. In the present embodiment, storage memory 18 contains a hypervisor program 24, an orchestration program 20; virtual machine 1 image 21 and virtual machine 2 image 22. Other images may be stored, but are not required to describe the invention. Hypervisor program 24 may or may not need an underlying operating system depending on the type of hypervisor.

Hypervisor program 24 comprises program code instructions which, when loaded in active memory 16 and executed, instruct platform 10 to perform the logical operations of hypervisor 26. Logical operations of hypervisor 26 include loading of virtual machine 1 and 2 images 21, 22 and orchestration program 20.

Virtual machine 1 and 2 images 21, 22 comprise program code instructions which, when loaded into active memory 16 supervised by an active hypervisor 26, instruct the platform 10 to perform the logical operations of respective virtual machines 1 and 2 31, 32.

Orchestration program 20 comprises program code instructions which, when loaded into active memory 16 supervised by hypervisor 26, instruct platform 10 to perform the logical operation of orchestration unit 300.

Figure 2:
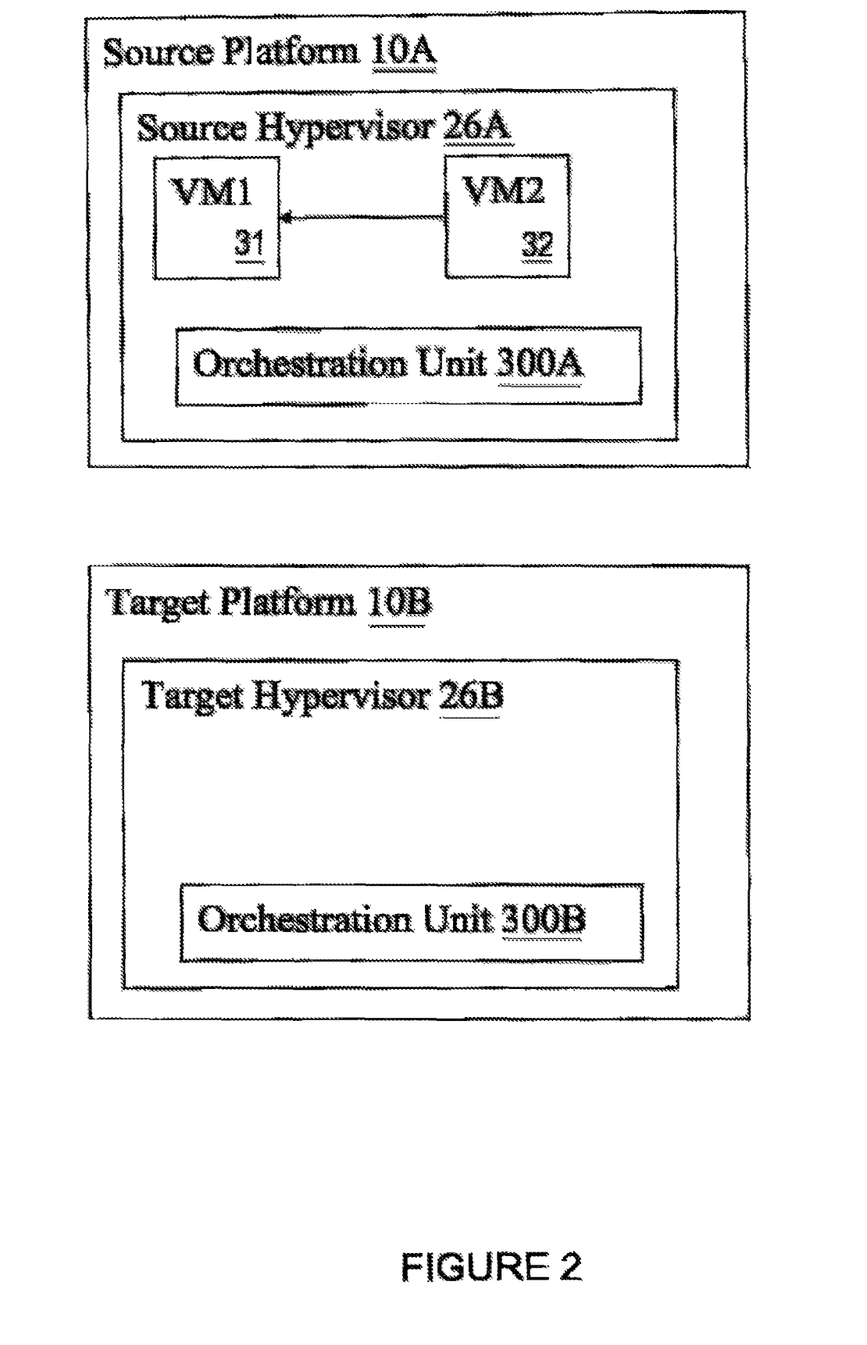
FIG. 2 illustrates a high-level state diagram showing an initial state of a source platform and a target platform in accordance with an embodiment of the present invention.

FIG. 2 is an initial state diagram of the present embodiment that includes a source platform 10A and a target platform 10B. Source platform 10A includes a source hypervisor 26A, two virtual machines VM1 31 and VM2 32, and orchestration unit 300A. Target platform 10B includes a target hypervisor 26B and an orchestration unit 300B. In this example, no virtual machines exist in target hypervisor 26B because it is waiting for the migration to occur. The arrow connecting VM2 32 to VM1 31 is shown pointing in the direction of data flow, indicating that VM1 31 is receiving data from and dependent on VM2 32. Only two VMs are shown in this example, but embodiments can handle three, four or more VMs.

Figure 3:
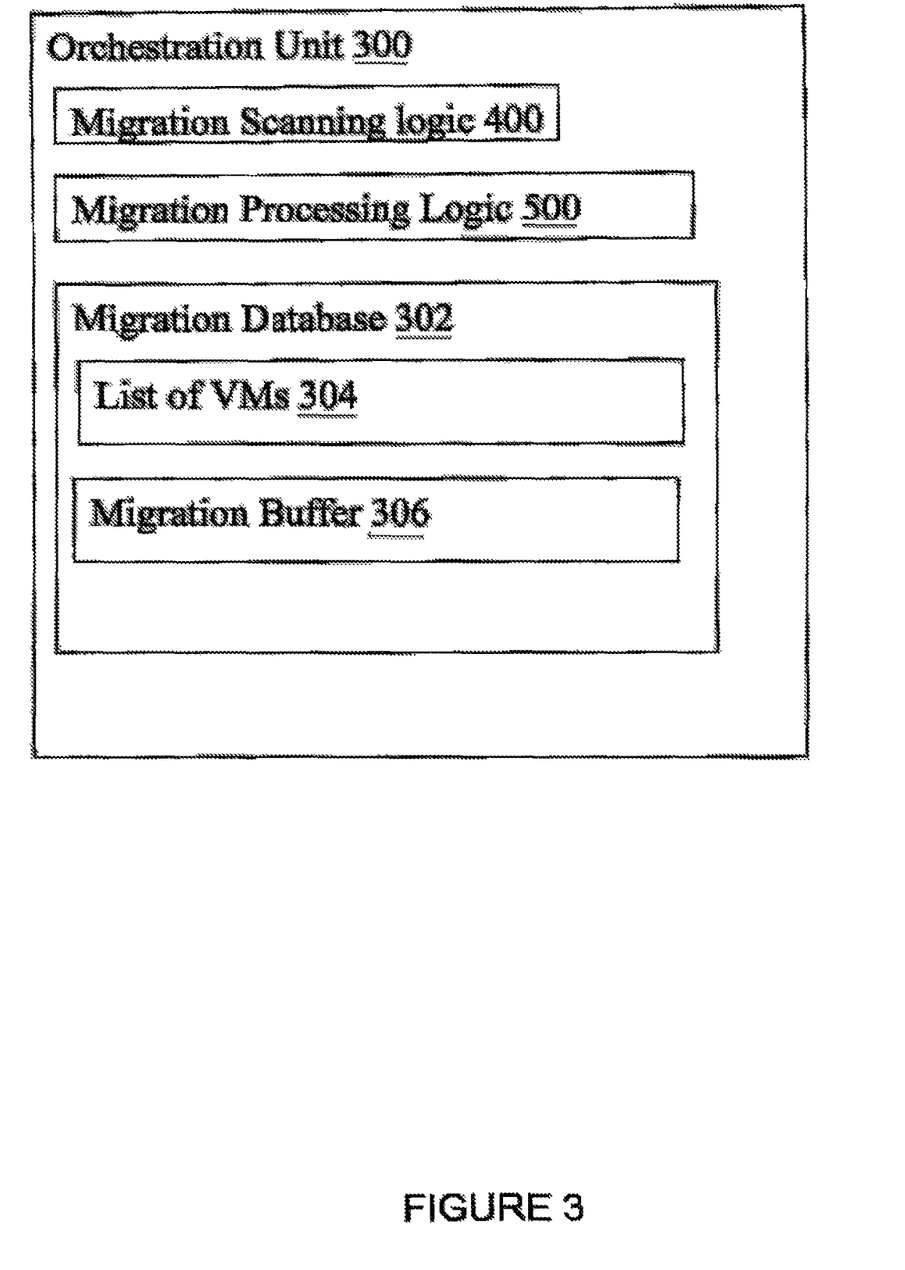
FIG. 3 illustrates a high-level component diagram in accordance with an embodiment of the present invention.
Figure 4:
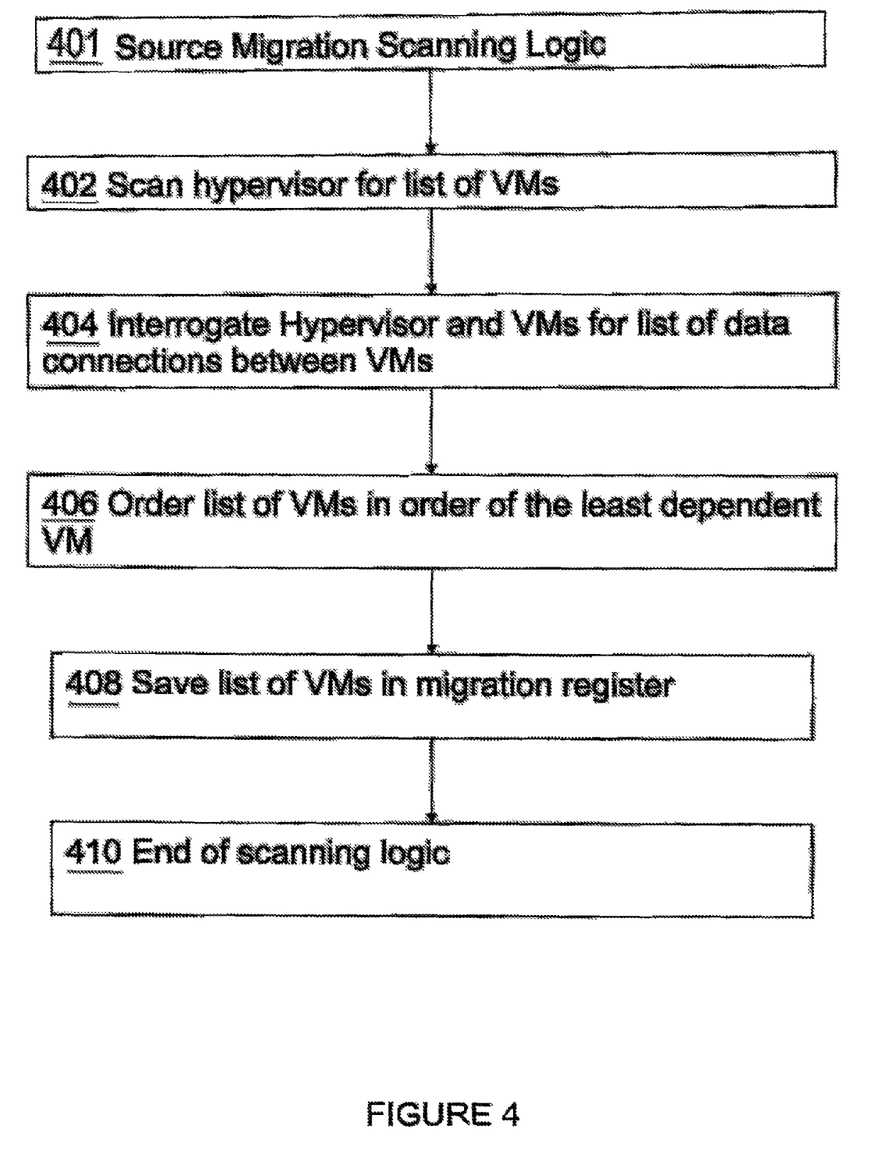
FIG. 4 illustrates a high-level logical flowchart of an exemplary process of source migration in accordance with an embodiment of the present invention.
Figure 5:
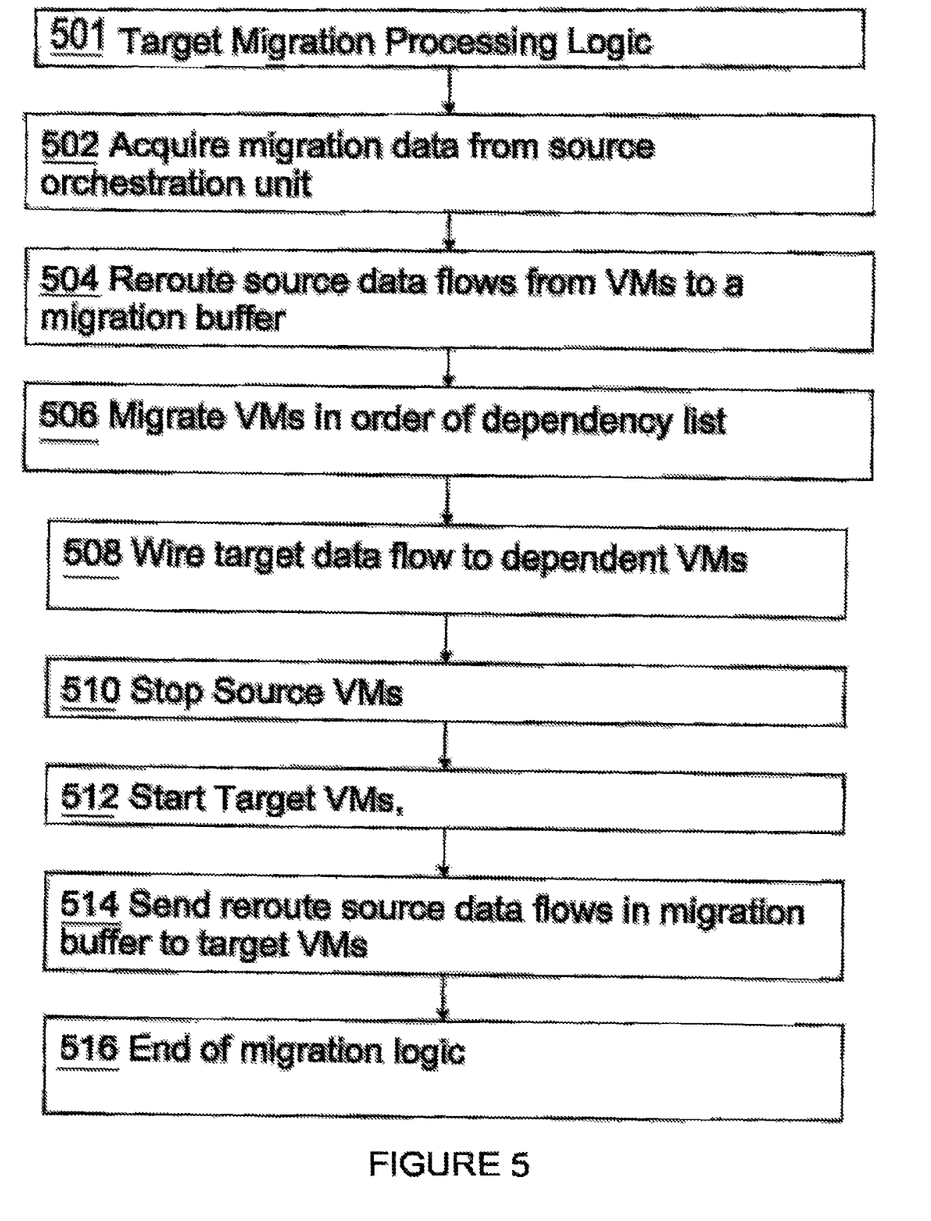
FIG. 5 illustrates a high-level logical flowchart of an exemplary process of target migration in accordance with an embodiment of the present invention.

Referring to FIG. 3, a generic orchestration unit 300 includes logical components, including migration scanning logic 400, migration processing logic 500, and migration database 302. Migration scanning logic 400, described in more detail below with reference to FIG. 4, is for scanning the hypervisor environment for virtual machine information and populating migration database 302. Migration processing logic 500, described in more detail below with reference to FIG. 5, is for performing the migration of the virtual machines in accordance with the migration data in the migration database 302. Migration database 302 is reserved space in memory for a list of virtual machines 304 in the hypervisor and a migration buffer 306. In one preferred embodiment the list of virtual machines is a linear list ordered by dependency so that the least dependent VM is at one end of the list and the most dependent VM is at the other. Another embodiment may have a structured list in which nodes within structure levels are ordered by dependency. Migration buffer 306 is a reserved space for VM data temporarily stored during migration.

In a preferred embodiment, migration of data-dependent VMs is accomplished in a two stage process, including source migration scanning logic 400 populating migration database 302 and then migration processing logic 500 using migration database 302 to migrate the VMs.

Referring now to FIG. 4, source migration scanning logic 400 is described as a series of logical process including blocks 401 through 410. The process begins at block 401, which depicts the initialization of source migration scanning logic 400. Proceeding to block 402, block 402 depicts the scanning of the hypervisor for all active VMs. At block 404, the hypervisor and the VMs are interrogated to understand the nature of their data connections. From block 404, the process continues to block 406, which depicts ordering the VMs in a data structure 304 by making inferences about the connections, data flow through the connections, and dependency of one VM for data on another VM. In a linear process, the dependencies will be in the same order as the linear process. In a process with feedback, an account of the feedback connections and amount of data in the feedback will be taken in the ordering. Further ordering based on amount of data flowing through the whole process and feedback connections will be considered in the ordering. From block 406, the process continues to block 408, which depicts saving the list of VMs and dependencies in migration database 302. The migration scanning logic process ends at block 410.

Referring now to FIG. 5, target migration processing logic 500 is described as a series of logical process step blocks 502 through 516. The process begins at block 501, which depicts the initialization of target migration processing logic 500. Proceeding to block 502, block 502 depicts acquiring migration data from a source orchestration unit 300A. From block 502, the process continues to block 504, which depicts the step of rerouting data flows from each VM to be migrated to migration buffer 304 in migration database 302. From block 504, the process continues to block 506, which depicts the step of migrating VMs in order from least dependent to most dependent. From block 506, the process continues to block 508, which depicts the step of wiring target data flow to dependent VMs. From block 508, the process continues to block 510, which depicts the step of stopping the source VMs 31, 32. From block 510, the process continues to block 512, which depicts the step of starting the target VMs. From block 512, the process continues to block 514, which depicts the step of sending rerouted source data flows from migration buffer 306 to the target VMs. The target migration logic process ends at step 516.

An example of the operation of the present embodiment is described below with reference to state block diagrams in FIGS. 2, 6, 7, 8, 9 and 10. In this example only a simple combination of two virtual machines and one data flow are shown and explained, but a skilled person would understand that the same principles can be applied to more than two virtual machines with two or more connections with data flowing between them.

As described above, FIG. 2 is an initial state diagram of the present embodiment comprising a source platform 10A and a target platform 10B. The arrow connecting VM2 32 to VM1 31 is shown pointing in the direction of data flow and indicating that VM1 31 is dependent on VM2 32. FIGS. 6 through 10 are subsequent state diagrams of the source platform 10A and target platform 10B during migration.

Figure 6:
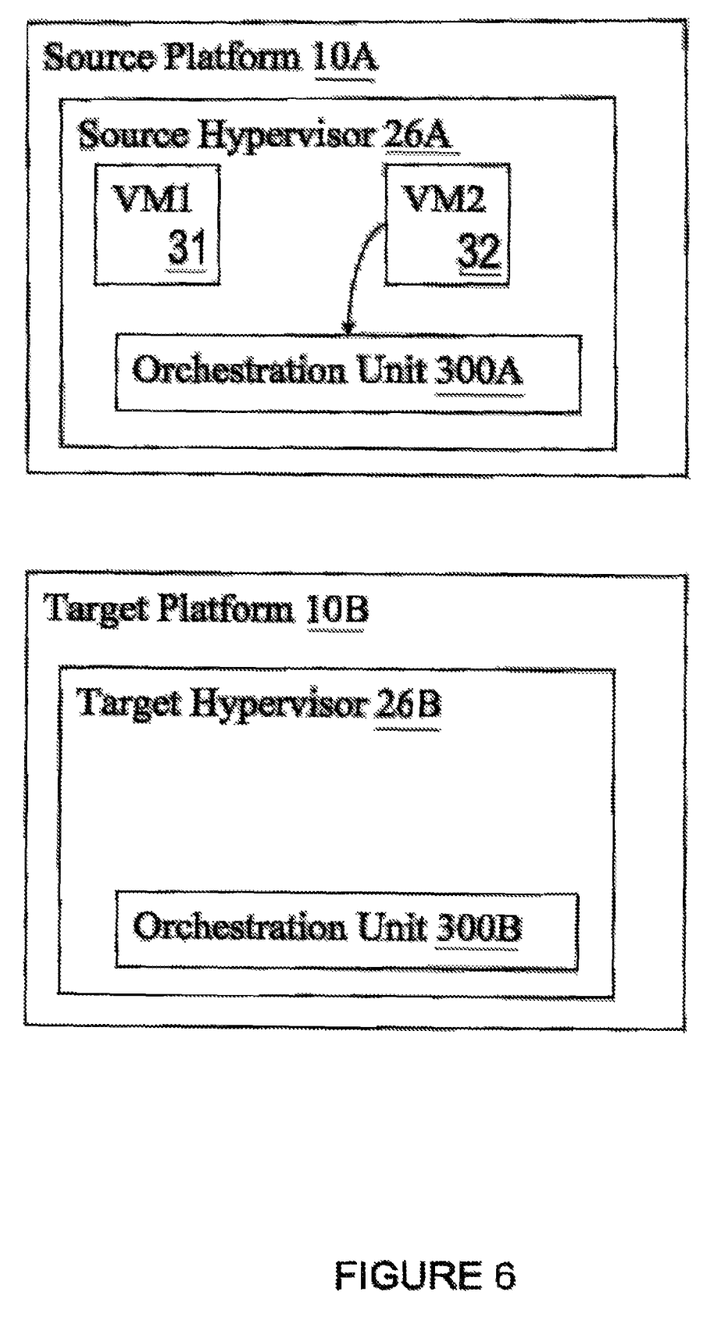
FIGS. 6 through 10 illustrate state diagrams showing subsequent states of the source platform and target platform during migration in accordance with an embodiment of the present invention.

Referring now to FIG. 6, the data flow connection of VM2 32 to VM1 31 has been rerouted to orchestration unit 300A and more particularly a migration buffer 306. This data flow rerouting represents all source VM connections being rerouted to the orchestration unit 300A, which segregates data from different source VMs.

Figure 7:
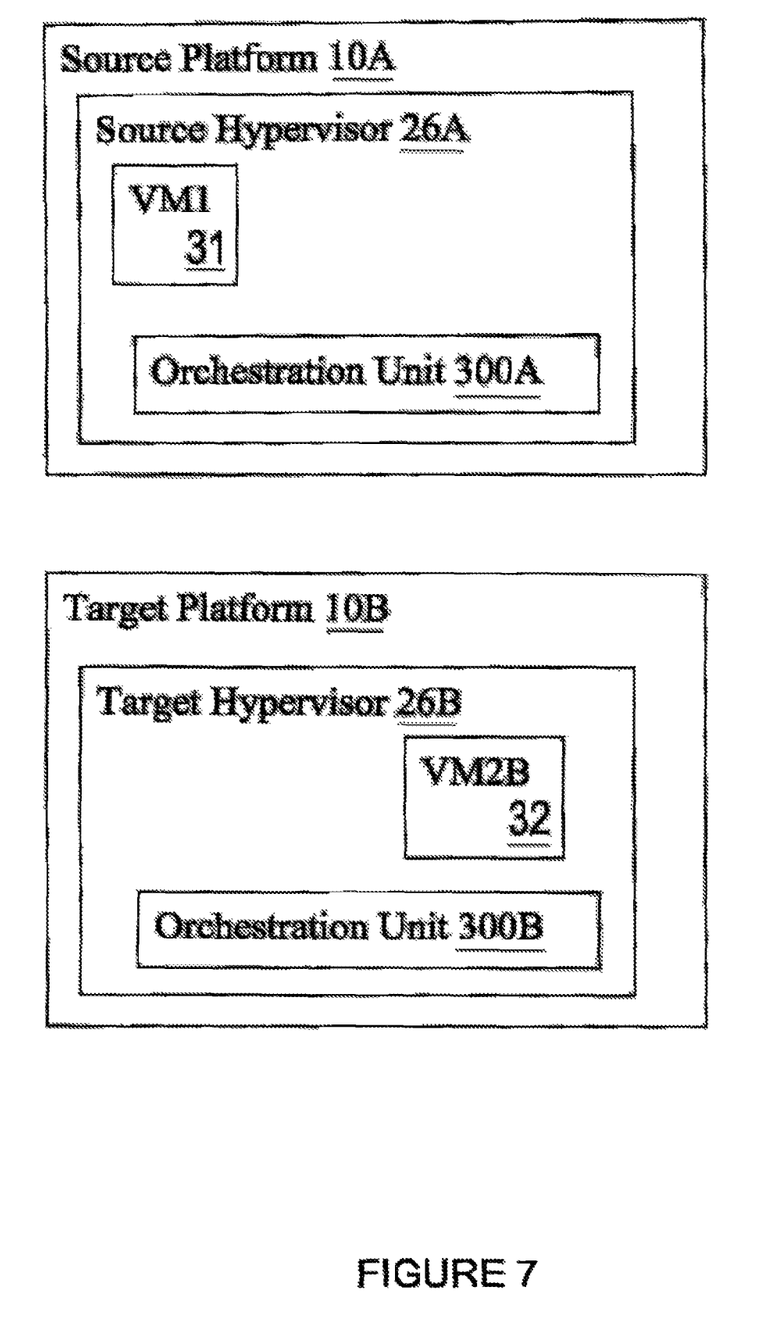

Referring now to FIG. 7, VM2 32 no longer operationally exists in the source hypervisor 26A, but has been migrated as VM2B 32 on target hypervisor 26B. VM2 32 has been migrated before VM1 31 because VM2 32 is the least dependent in the example. In the present embodiment, migration of VMs is performed in order from least dependent to more dependent, but in other embodiments a different migration order can be employed.

Figure 8:
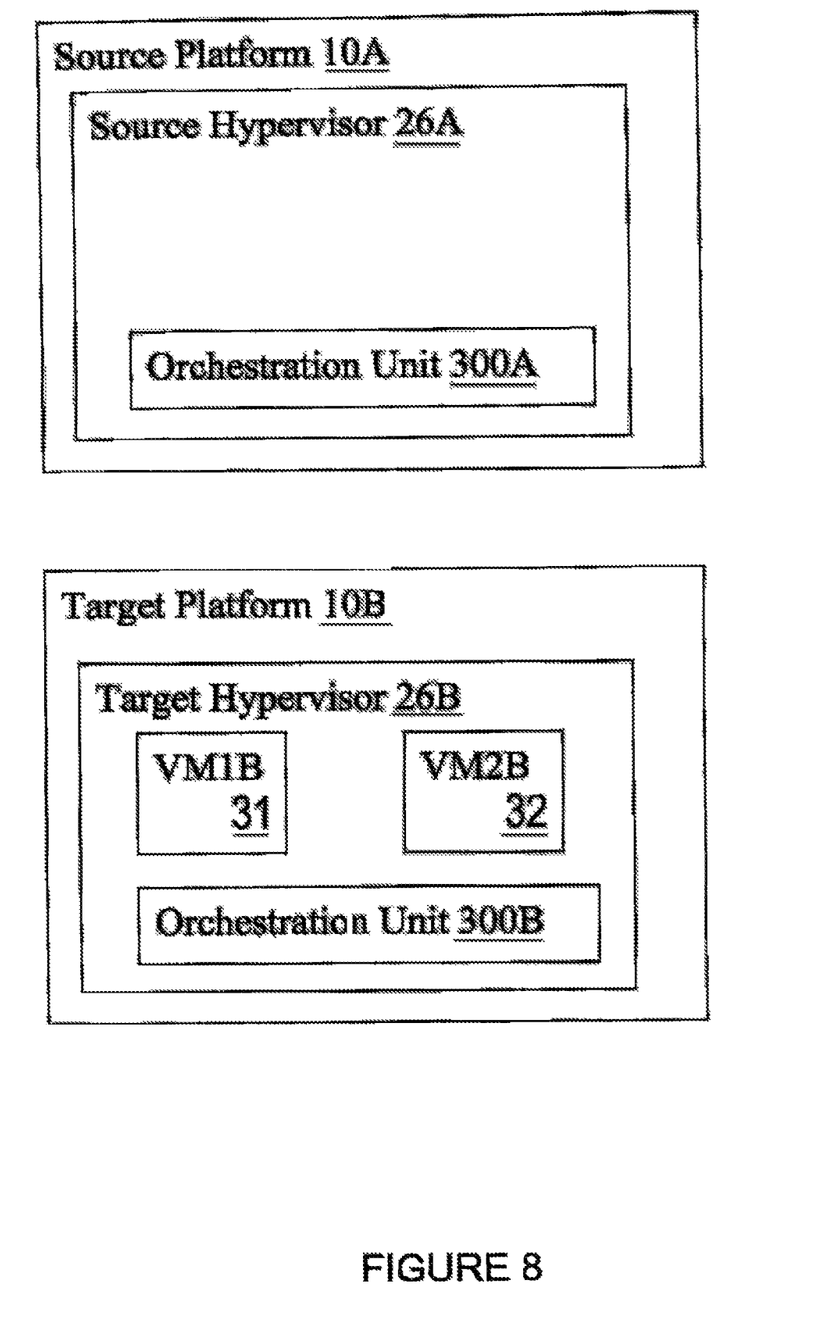

Referring now to FIG. 8, VM1 31 no longer exists operationally in the source hypervisor 26A, but has been migrated as VM1B 31 on target hypervisor 26B. This depicted state represents that the most dependent VM is migrated last and that all source VMs have been migrated. At this stage, the data flows into orchestration unit 300A have finished. Source VMs can be stopped in hypervisor 26A so that updates can take place. The source VMs may be removed and replaced or updated in place. In the state diagrams they are shown as removed.

Figure 9:
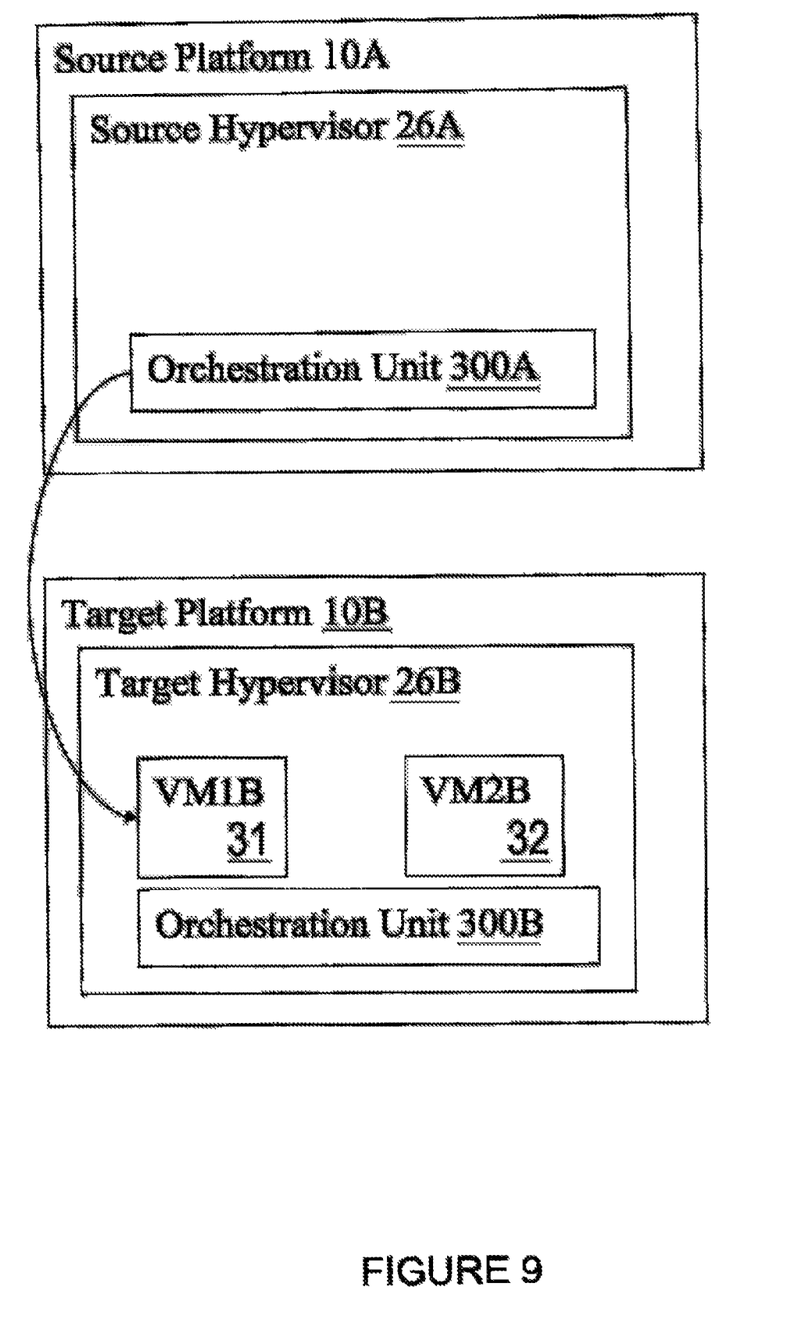

Referring now to FIG. 9, source VM data flows stored in the migration buffer 306 are now wired to the instantiated target VMs. In the example, VM1B 31 receives the data flow from orchestration unit 300A.

Figure 10:
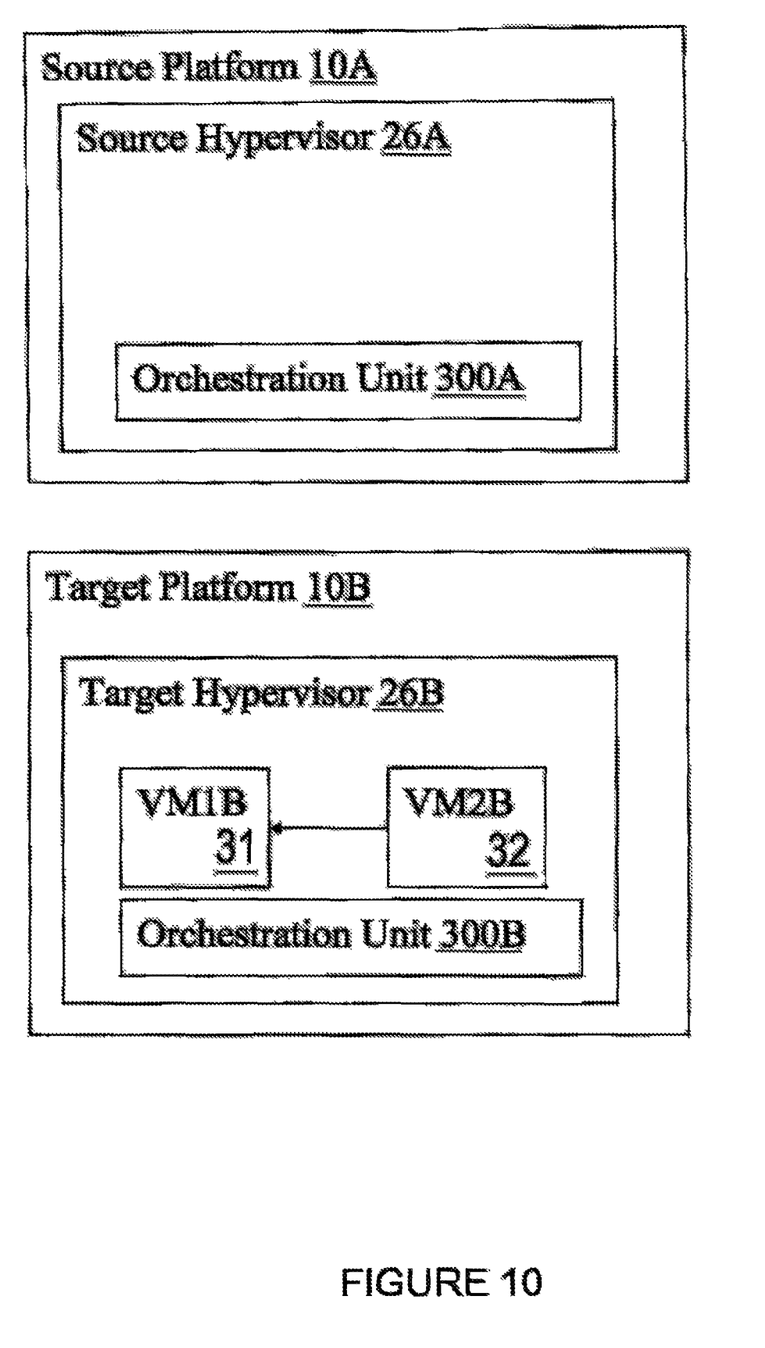

Referring now to FIG. 10, the data flow connection from the orchestration unit 300A to VM1B 31 is no longer shown, representing that the migration data flows have ended. A new data flow connection from VM2B 32 to VM1B 31 is further illustrated, representing that data flows in the target VMs have been wired. Once the VM connections have all been wired, then the VMs can be made active and the synchronized migration is complete.

In summary, a method, system, and computer program product for migrating two or more dependent virtual machines from a source hypervisor to a target hypervisor as disclosed. A list of active and connected virtual machines in the source hypervisor is acquired. Connections between the source virtual machines are rerouted to a buffer so that data flowing between the source virtual machines is captured. The source virtual machines are migrated to a target hypervisor and are connected in the same manner as in the source hypervisor. The buffered data is migrated to the respective migrated virtual machines, and the target virtual machines are activated. The virtual machines can be migrated in order of data flow dependency such that the least dependent virtual machine is migrated first.

It will be clear to one of ordinary skill in the art that all or part of the method of the preferred embodiments of the present invention may suitably and usefully be embodied in a logic apparatus or a plurality of logic apparatus comprising logic elements arranged to perform the steps of the method and that such logic elements may comprise hardware components, software components, firmware components, or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates, for example, in a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors, and that the software may be provided in the form of one or more computer program elements carried on any suitable data-carrier or storage device (not shown in the figures) such as a magnetic or optical storage disk or the like.

The present invention may further suitably be embodied as a computer program product for use with a computer system. Such an implementation may comprise computer-readable program code fixed on a tangible medium/device, such as a diskette, CD-ROM, ROM, or hard disk.

Those skilled in the art will appreciate that such computer-readable program code can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A method for migrating two or more virtual machines in a source hypervisor to a target hypervisor comprising:

acquiring a list of active and connected virtual machines in the source hypervisor on a source platform;

rerouting data connections between the virtual machines to a buffer so that data flowing between the virtual machines is captured and buffered;

migrating the virtual machines to a target hypervisor on a target platform;

re-establishing the data connections between the migrated virtual machines in the target hypervisor as the data connections were in the source hypervisor;

migrating the buffered data to the migrated virtual machines; and activating the virtual machines in the target hypervisor.

2. The method according to claim 1, wherein migrating the virtual machines includes migrating the virtual machines in order of data flow dependency.

3. The method according to claim 2, wherein the least dependent virtual machine is migrated first.

4. The method according to claim 1, wherein virtual machine data is buffered in the source hypervisor.

5. The method according to claim 1, wherein virtual machine data is buffered in the target hypervisor.

6. The method according to claim 1, and further comprising interrogating the source hypervisor to locate the virtual machines and the data connections between the virtual machines.

* * * * *